United States Patent [19]

Ueda

[11] Patent Number: 5,784,930
[45] Date of Patent: Jul. 28, 1998

[54] BICYCLE PEDAL HAVING A BRACE MEMBER THAT ROTATES RELATIVE TO A CLEAT ENGAGING MECHANISM

[75] Inventor: Yutaka Ueda, Tondabayashi, Japan

[73] Assignee: Shimano, Inc., Osaka, Japan

[21] Appl. No.: 676,929

[22] Filed: Jul. 8, 1996

[30] Foreign Application Priority Data

Jul. 12, 1995 [JP] Japan ................... 7-176305

[51] Int. Cl.⁶ .................................................. B62M 3/08
[52] U.S. Cl. .................................. 74/594.6; 74/594.4
[58] Field of Search ..................... 74/594.6, 594.4; 36/131

[56] References Cited

U.S. PATENT DOCUMENTS

| | | | |
|---|---|---|---|
| 5,115,692 | 5/1992 | Nagano | 74/594.4 |
| 5,203,229 | 4/1993 | Chen | 74/594.6 |
| 5,259,270 | 11/1993 | Lin | 74/594.6 |
| 5,377,561 | 1/1995 | Danieli et al. | 74/594.6 |
| 5,417,128 | 5/1995 | Beyl | 74/594.6 |
| 5,419,218 | 5/1995 | Romano | 74/594.6 |
| 5,423,233 | 6/1995 | Peyre et al. | 74/594.6 |
| 5,557,985 | 9/1996 | Nagano | 74/594.6 |

FOREIGN PATENT DOCUMENTS

| | | |
|---|---|---|
| 0 146 454 A3 | 6/1985 | European Pat. Off. . |
| 0 372 165 A2 | 6/1990 | European Pat. Off. . |
| 0 428 140 A1 | 5/1991 | European Pat. Off. . |
| 0 516 013 A2 | 12/1992 | European Pat. Off. . |
| 0 568 109 A1 | 11/1993 | European Pat. Off. . |
| 0 569 048 A1 | 11/1993 | European Pat. Off. . |
| 0 572 291 A1 | 12/1993 | European Pat. Off. . |
| 0 576 042 A2 | 12/1993 | European Pat. Off. . |
| 0 619 219 A1 | 10/1994 | European Pat. Off. . |
| 2 609 270 | 7/1988 | France . |
| 3833790 | 4/1990 | Germany ............... 74/594.6 |
| 43 23 575 A1 | 5/1994 | Germany . |
| 3-159893 | 7/1991 | Japan . |
| 5319350 | 12/1993 | Japan ............... 74/594.6 |

OTHER PUBLICATIONS

European Search Report for EP 96 30 5142, dated Oct. 18, 1996.

*Primary Examiner*—Charles A. Marmor
*Assistant Examiner*—Mary Ann Battista
*Attorney, Agent, or Firm*—James A. Deland

[57] ABSTRACT

A bicycle pedal of the type that can be linked to a cleat affixed to a bicycle shoe has front and rear cleat engaging members disposed on a pedal body for engaging corresponding front and rear portions of the cleat. A brace member is positioned behind the rear cleat engaging member such that the brace member has a height that is greater than or equal to a height of the rear cleat engaging member. The brace member acts as a stable surface for eliminating looseness between the pedal and the shoe.

15 Claims, 7 Drawing Sheets

BICYCLE PEDAL HAVING A BRACE MEMBER THAT ROTATES RELATIVE TO A CLEAT ENGAGING MECHANISM

BACKGROUND OF THE INVENTION

The present invention is directed to bicycle pedals and, more particularly, to a bicycle pedal that can be linked to a cleat affixed to a bicycle shoe.

The invention disclosed in Japanese Laid-Open Patent Application 3-159893, called a clipless pedal, is known as a bicycle pedal that can be linked with a bicycle shoe. This clipless pedal has a pedal spindle that can be mounted on the crank of a bicycle, a pedal body that is rotatably supported on this pedal spindle, and a linking member comprising a pair of front and rear cleat engagement members that are fixed on either side of the pedal body and are capable of engaging front and rear portions of a cleat. The pedal body has a tread surface positioned so as to surround both sides of the linking member. This tread surface has only a small surface area because the pedal body has as small a volume as possible so that it will be lightweight. Also, the cleat engagement members have a cleat receiving member that receives the cleat bottom.

With this type of clipless pedal, if the shoe and the pedal are loose to the right and left around the cleat engagement members, then the foot will wobble to the right and left and the pedaling force will not be transmitted efficiently to the pedal. Therefore, any looseness to the right and left between the shoe and pedal is suppressed by having the rubber portion of the shoe sole come into contact on the right and left of the cleat with a tread surface provided to the pedal body. This looseness to the right and left is also suppressed by receiving the cleat bottom with the cleat receiving member.

The conventional structure described above merely consists of bringing the rubber portion of the shoe sole into contact with a tread surface having a tiny surface area in order to suppress looseness to the right and left of the shoe, and receiving the cleat bottom by a cleat receiving member. Therefore, the contact length is minimal, and it is difficult to suppress properly the looseness to the right and left. In particular, since the portion of the shoe sole that is in contact with the tread surface is the same portion that comes into contact with the ground when the rider is walking, it tends to wear down, and when this portion wears down, the tread surface and the shoe sole no longer come into contact uniformly, making it difficult to suppress the looseness between the shoe and pedal.

SUMMARY OF THE INVENTION

The present invention is directed to a bicycle pedal that can be linked to a cleat affixed to a bicycle shoe, wherein a brace member prevents looseness between the shoe and the pedal. In one embodiment of the present invention, front and rear cleat engaging members are disposed on a pedal body for engaging corresponding front and rear portions of the cleat. A brace member is positioned behind the rear cleat engaging member such that the brace member has a height that is greater than or equal to a height of the rear cleat engaging member. The brace member acts as a stable surface for eliminating looseness between the pedal and the shoe.

In a more specific embodiment, first and second stopper members may be disposed on opposite sides of the front and rear cleat engaging members in an axial pedal direction and may be fixed relative to the front and rear cleat engaging members. The first and second stopper members extend in a longitudinal direction perpendicular to the axial pedal direction. To facilitate engagement of the cleat with the pedal, the first and second stopper members may be aligned below the front cleat engaging member so as not to interfere when the cleat is entering the front cleat engaging member.

If desired, the brace member may be fixed directly to the first and second stopper members. Alternatively, a tread cage which substantially surrounds the front and rear cleat engaging members and the first and second stopper members may be coupled to the pedal body for rotation relative to the pedal body. In this case the brace member bridges a rear portion of the tread cage and is fixed thereto. An abutment is spaced apart from the brace member and defines an opening between the abutment and the brace member. The first and second stopper members may extend into the opening for alternately contacting the abutment and the brace member for limiting rotation of the first and second stopper members relative to the tread cage. A spring is disposed between the tread cage and the first and second stopper members for biasing the rear cleat engaging member downward relative to the brace member. This exposes the front cleat engaging member so that the tread cage does not interfere when the cleat is entering the front cleat engaging member. When the cleat is engaged with the front and rear cleat engaging members, the tread cage is positioned so that the shoe contacts the brace member.

DETAILED DESCRIPTION OF THE EMBODIMENTS

Figure 1:
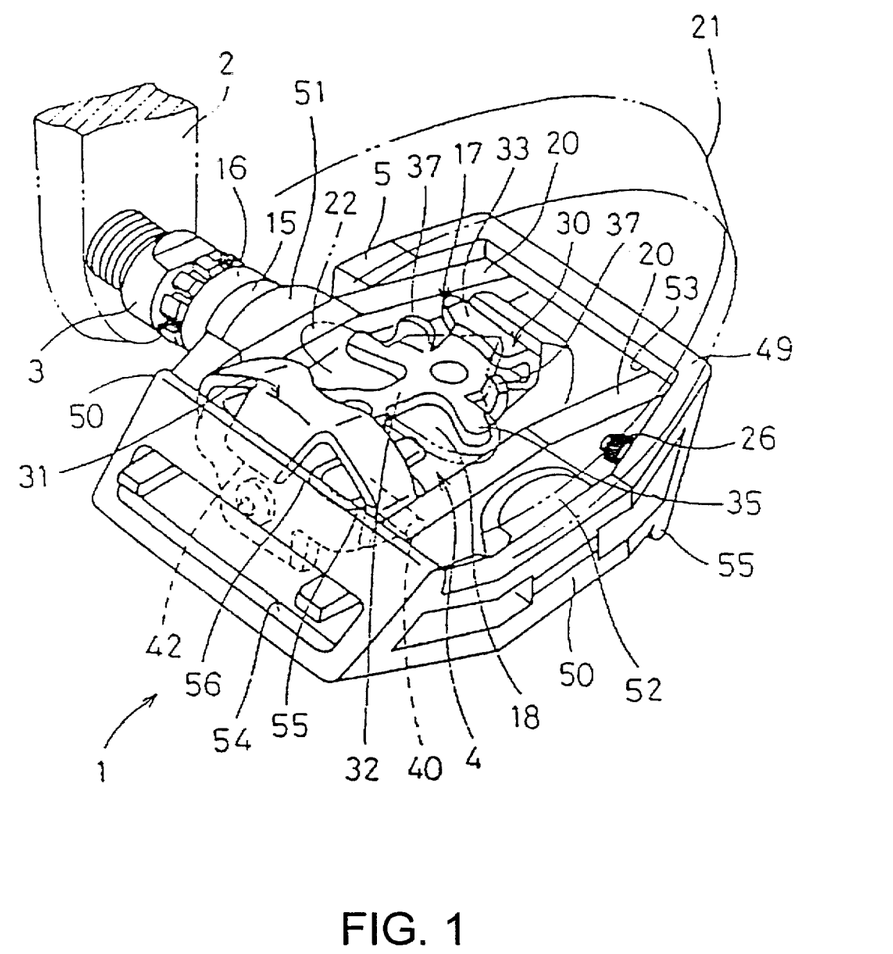
FIG. 1 is an oblique view of a particular embodiment of a bicycle pedal according to the present invention.

FIG. 1 is an oblique view of a particular embodiment of a bicycle pedal 1 according to the present invention. As shown in FIG. 1, pedal 1 comprises a pedal spindle 3 that is fastened to the crank 2 of a bicycle, a linking member 4 that is rotatably supported by the pedal spindle 3 for linking to a cleat 22 attached to a shoe 21, and a tread cage 5 that is positioned around the linking member 4 and is rotatably supported relative to the linking member 4.

Figure 3:
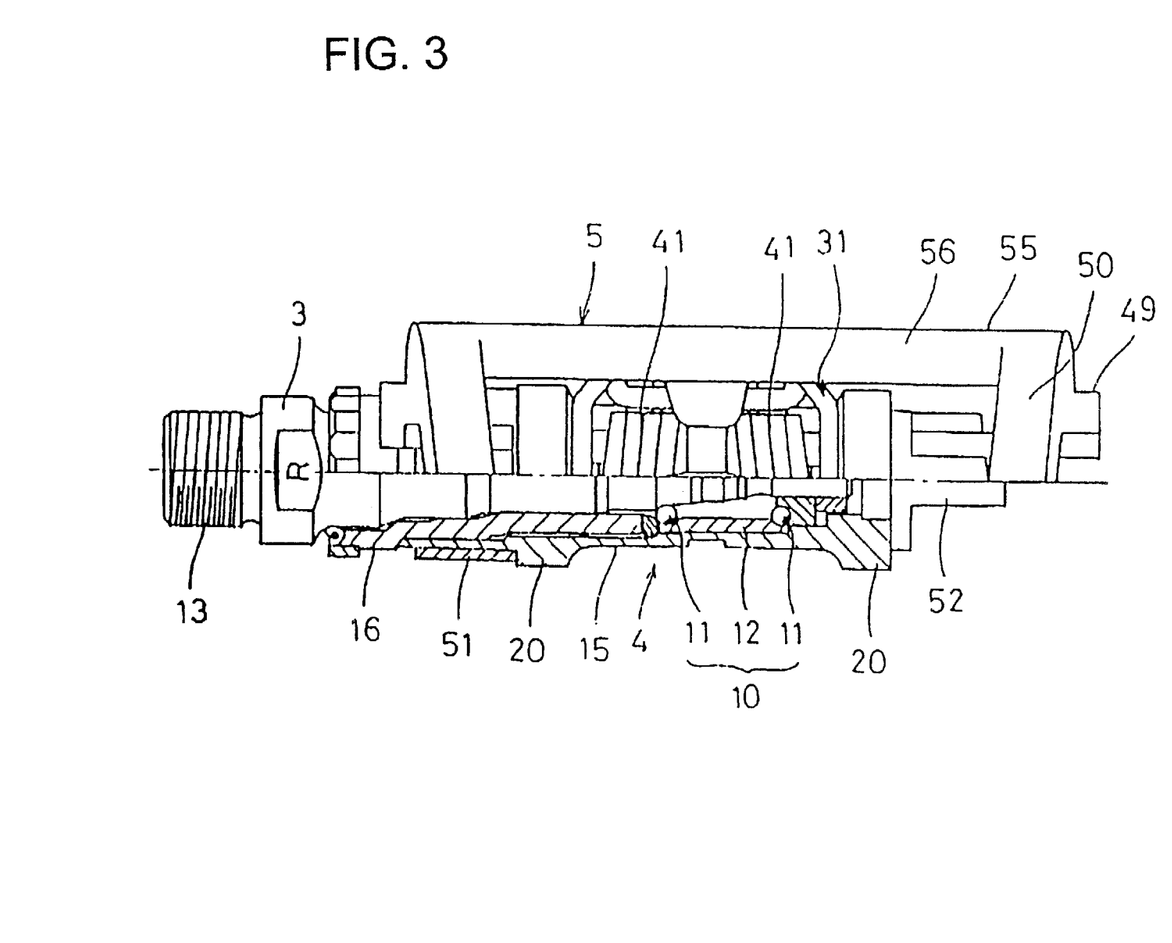
FIG. 3 is a partial cross-sectional view taken along line III—III of FIG. 2.
Figure 4:
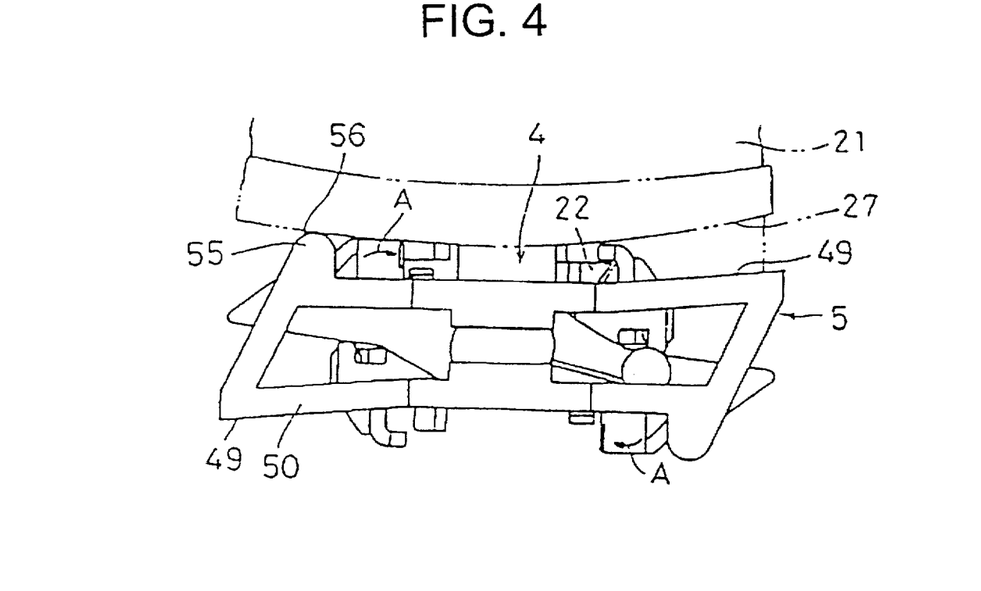
FIG. 4 is a side view of the bicycle pedal shown in FIG. 1.

As shown in FIG. 3, the pedal spindle 3 is a multi-step spindle having numerous stepped portions, and the tip thereof rotatably supports the linking member 4 by means of a bearing 10. This bearing 10 has numerous steel balls 11 positioned in alignment in the peripheral direction at a distance in the axial direction from the outer periphery of the tip of the pedal spindle 3. An outer ring 12 houses the steel balls 11. A threaded component 13 that threads into the crank 2 (FIG. 1) is formed at the base end of the pedal spindle 3.

Figure 2:
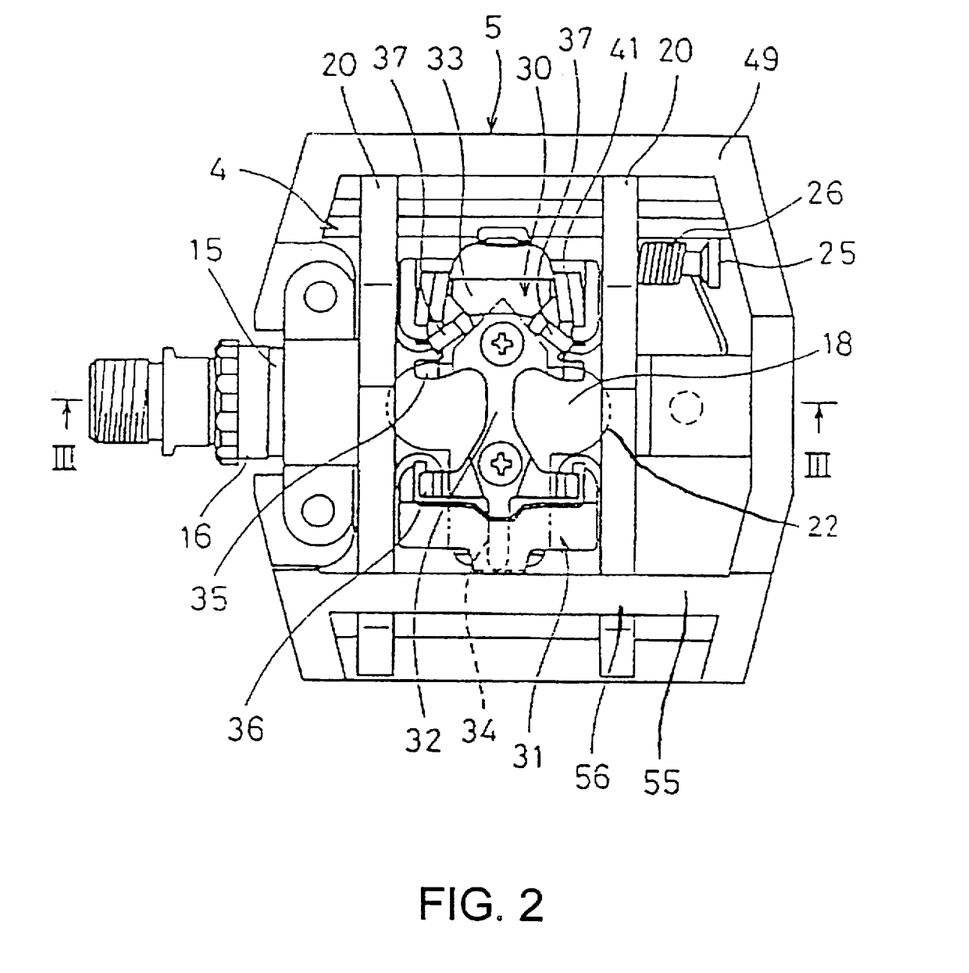
FIG. 2 is a plan view of the bicycle pedal shown in FIG. 1.
Figure 5A:
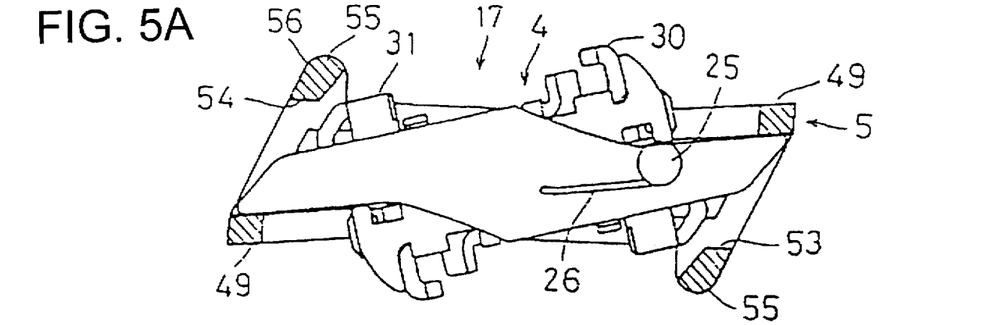
FIGS. 5A and 5B illustrate the operation of the bicycle pedal shown in FIG. 1.

As shown in FIGS. 1 through 4, the linking member 4 has an outer tube 15 that is rotatably supported by the pedal spindle 3 and on the inside of which is fitted the outer ring 12, an inner tube 16 that is fitted into the outer tube 15 such that its end is in contact with the outer ring 12, and a cleat engagement mechanism 17. The outer tube 15 and the inner tube 16 are concentrically arranged around the outside of the pedal spindle 3. The base end of the inner tube 16 projects out from the outer tube 15 on the crank 2 side at the same diameter as the outer tube 15. A pair of stopper members 20 that extend forward and backward are provided around the outside of the outer tube 15 on opposite sides of the cleat engaging mechanism. Between the pair of stopper members 20, the outer tube 15 defines an engagement fixing surface 18 that serves to fix the cleat engagement mechanism 17. As shown in FIG. 2, a pin 25 extends from the front side surface of one of the stopper members 20, and a helical spring 26 is wound around the outside of the pin 25. One end of this spring is engaged with the stopper member 20, and the other end is engaged with the tread cage 5. This helical spring 26 biases the linking member 4 counterclockwise relative to the tread cage 5 as shown in FIG. 5A.

The cleat engagement mechanism 17 engages the pedal 1 with the cleat 22 attached to the sole of a bicycle shoe 21. The cleat engagement mechanism 17 has a front cleat engagement member 30 that engages the front of the cleat and a rear cleat engagement member 31 that engages the rear of the cleat. The front cleat engagement member 30 is symmetrical on the left and right. Cleat engagement member 30 has a fixed member 32 that is fixed to the engagement fixing surface 18, and a cleat clamping member 33 that curves out in a U shape above the front of the fixed member 32. A rotation stopper 34 that extends rearward is formed at the rear of the fixed member 32, and a pair of cleat supports 35 and 36 extend to the right and left in the center of the fixed member 32 with a space between them in the forward and backward direction. In the fixed member 32, a movement restricting stopper 37 that restricts the forward movement of the cleat is formed such that it curves upward between the cleat clamping member 33 and the cleat support 35.

The rear cleat engagement member 31 is curved in a roughly inverted U shape, and the two ends thereof are swingably supported by a fixed shaft 40 (see FIG. 1) that passes between the stopper members 20. A canceling spring 41 (the one shown in FIG. 2 is used for the rear cleat engagement member 31 on the back side) is wound around the outside of this fixed shaft 40, and this spring 41 biases the rear cleat engagement member 31 such that it always rotates forward (the direction of the arrow A in FIG. 4). In order to restrict this forward rotation, a tongue 42 that is in contact with the rotation stopper 34 extends downward in the center at the rear of the rear cleat engagement member 31.

The tread cage 5 is made of an aluminum alloy, for example, and has a frame 50 that is in the form of a compressed octagon (in plan view) and includes has a tread surface 49. A first bearing 51 is fixed to the crank 2 side of the frame 50 and is rotatably supported around the outside of the base end of the outer tube 15, and a second bearing 52 is fixed to the outer side of the frame 50 and is rotatably supported around the outer tip of the outer tube 15. Openings 53 and 54 are formed in the front and rear portions of the frame 50, and the tips of the stopper members 20 extend into these openings 53 and 54. The linking member 4 is biased in the counterclockwise direction by the helical spring 26 with respect to the tread cage 5 as shown in FIG. 5A, but counterclockwise rotation is restricted when the stopper members 20 inserted into the openings 53 and 54 hit the upper side of the opening 53. When the linking member 4 is in this position, the cleat clamping member 33 of the front cleat engagement member 30 is positioned above the tread surface 49 of the tread cage 5, and the rear cleat engagement member 31 is positioned below a brace member 55 (discussed below) disposed on the tread cage 5. As a result, when the shoe 21 is placed on the pedal 1, the cleat 22 can be engaged with the front cleat engagement member 30 without the shoe sole 27 interfering with the tread cage 5.

Figure 5B:
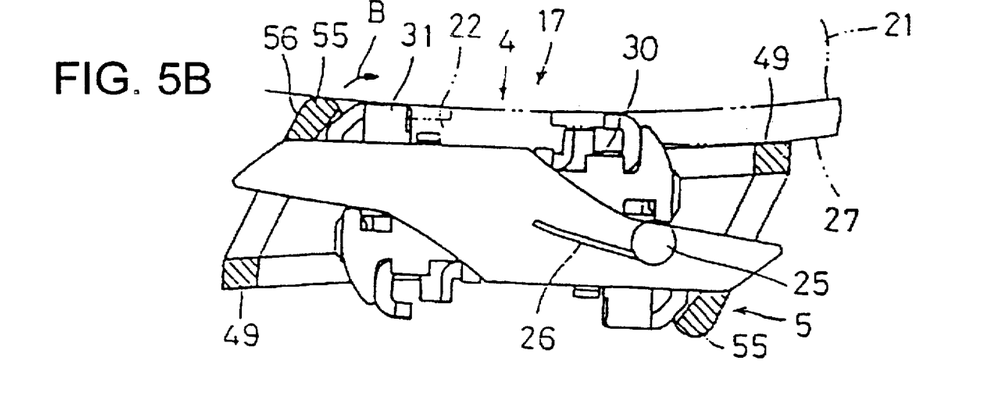

A brace member 55 that projects upward is formed on both sides at the rear end of the frame 50 of the tread cage 5. In this embodiment the brace member 55 has a semicircular cross section, and the rear end thereof is a guide member 56 that is used to guide the cleat 22 smoothly. As shown in FIG. 5B, the height of the brace member 55 is essentially the same as the height of the rear cleat engagement member 31 when the cleat 22 is engaged in the cleat engagement mechanism 17. Also, as shown in FIG. 2, the length of the brace member 55 in the pedal axial direction is greater than the length of the rear cleat engagement member 31. If a brace member 55 such as this is provided to the rear of the rear cleat engagement member 31, then the shoe sole 27 will be supported by brace member 55, and the looseness of the shoe to the right and left will be suppressed. As a result, the leg will not swing to the right and left, and the pedaling force will be transmitted to the pedals efficiently. In addition, since the guide member 56 of the brace member 55 serves as a guide for the shoe sole when the shoe 21 is attached, the cleat 22 attached to the shoe 21 can be smoothly guided to the cleat engagement mechanism 17.

Operation of the pedal will now be described with reference to FIGS. 5A and 5B. In a state in which the shoe is not attached to the pedal 1, as shown in FIG. 5A, the front cleat engagement member 30 of the linking member 4 is biased by the helical spring 26 and is positioned above the tread surface 49 of the tread cage 5, while the rear cleat engagement member 31 is positioned below the tread cage 5. When the shoe 21 is to be attached to the pedal 1, the tip of the shoe sole 27 is moved forward toward the front cleat engagement member 30 while in contact with the brace member 55, and the tip of cleat 22 is inserted into the cleat clamping member 33. In this state, since the front cleat engagement member 30 is positioned above the tread surface 49 of the tread cage 5, the tread cage 5 does not get in the way, and the tip of the cleat 22 can be easily inserted into the front cleat engagement member 30.

Once the tip of the cleat 22 has been inserted into the cleat clamping member 33 of the front cleat engagement member 30, force is applied to the heel side of the shoe 21, and the shoe 21 is pushed down toward the pedal 1. As a result, the brace member 55 is pressed, the tread cage 5 and the linking member 4 rotate relative to each other against the biasing force of the helical spring 26, and the two end up nearly parallel, as shown in FIG. 5B. When the heel is pressed down further from this state, the rear end of the cleat 22 rotates the rear cleat engagement member 31 backward (the opposite direction from the arrow A in FIG. 4) against the biasing force of the spring 41, and the cleat 22 slides between the two cleat engagement members 30 and 31. Once the cleat 22 has slid between the two cleat engagement members 30 and 31, the rear cleat engagement member 31 is biased by the spring 41 into its original position wherein the tongue 42 hits against the rotation stopper 34. As a result, the cleat 22 is engaged between the two cleat engagement members 30 and 31.

When the cleat 22 is engaged in the two cleat engagement members 30 and 31, since the tread cage 5 is biased by the helical spring 26 forward (the direction of the arrow B in FIG. 5B) with respect to the linking member 4, the shoe sole 27 comes into contact with the brace member 55. As a result, the shoe sole 27 is stabilized, the shoe 21 resists leaning to the left or right, and the pedaling force is transmitted efficiently to the pedal 1. Also, even if a tread cage 5 having a relatively wide tread surface 49 is positioned around the linking member 4, since the tread cage 5 and the linking member 4 rotate relative to each other, the front cleat engagement member 30 can always be positioned above the tread cage 5, and the engagement of the cleat 22 is easy.

When the shoe 21 is placed on the pedal 1 in a state in which the cleat 22 is not engaged with the two cleat engagement members 30 and 31, then the linking member 4 rotates and the cleat engagement mechanism 17 retracts wide tread surface 49, sole 27 hits the wide tread surface 49, and the leg is able to move the pedal 1 in a stable attitude without wobbling to the left and right, so the function of a clipless pedal and the function of a double-sided pedal can both be realized with a single pedal. Accordingly, the pedaling force can be transmitted efficiently to the pedal 1 even in a state in which the cleat is not engaged during frequent cornering or in a state in which cleat engagement is impossible because of mud clogging during a race. Also, when the shoe is to be removed from the pedal 1, if the heel portion of the shoe 21 is lightly twisted to the outside, the rear cleat engagement member 31 will rotate to the rear against the energizing force of the spring 41, and the engagement of the rear end of the cleat 22 will be released instantly.

Figure 6:
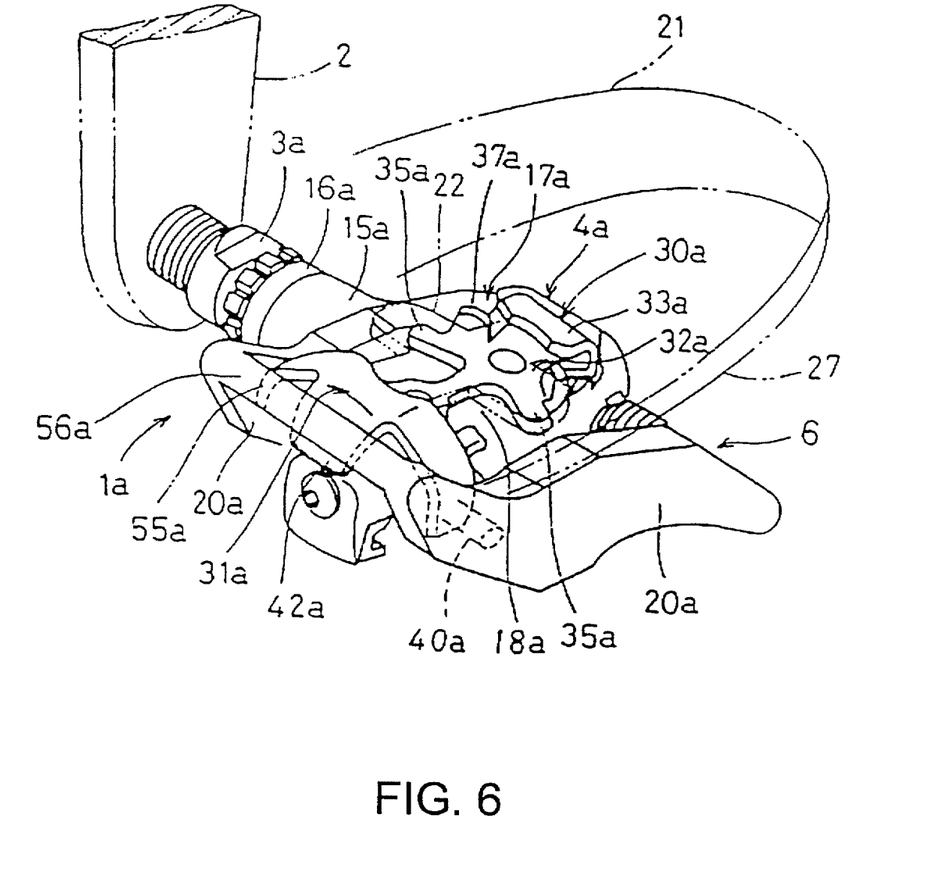
FIG. 6 is an oblique view of an alternative embodiment of a bicycle pedal according to the present invention.

In the embodiment shown in FIG. 1, a tread cage 5 was rotatably supported relative to a linking member 4, but the looseness to the right and left of the shoe with respect to the pedal when the cleat 22 is attached can also be suppressed if the brace member 55 and the cleat engagement members 30 and 31 are fixed relative to each other. FIG. 6 is an oblique view of such an embodiment of a bicycle pedal according to the present invention. As shown in FIG. 6, A pedal 1a comprises a pedal spindle 3a that is fastened to the crank 2 of a bicycle, a linking member 4a that is rotatably supported by pedal spindle 3a and is capable of linking to a cleat 22 that is attached to a shoe 21, and a brace frame 6 that is positioned around this linking member 4a.

Figure 8:
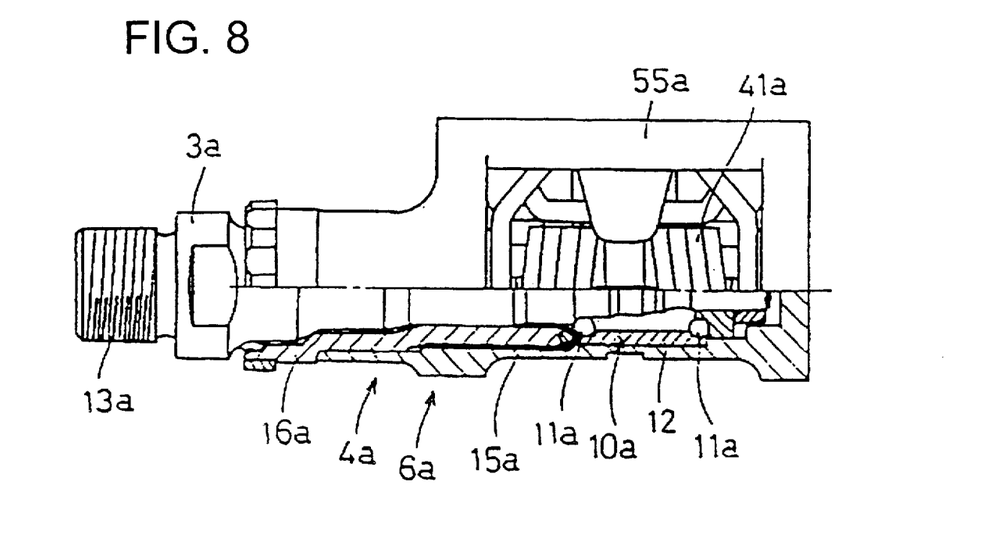
FIG. 8 is a partial cross-sectional view taken along line VIII—VIII in FIG. 7.

As shown in FIG. 8, the pedal spindle 3a is a multi-step spindle having numerous stepped portions, and the tip thereof rotatably supports the linking member 4a by means of a bearing 10a. Bearing 10a has numerous steel balls 11a positioned in alignment in the peripheral direction at a distance in the axial direction from the outer periphery of the tip of the pedal spindle 3a, and an outer ring 12a houses the steel balls 11a. A threaded component 13a that threads into the crank 2 (FIG. 6) is formed at the base end of the pedal spindle 3a.

As shown in FIGS. 6 through 9, the linking member 4a has an outer tube 15a that is rotatably supported by the pedal spindle 3a and on the inside of which is fitted the outer ring 12a, an inner tube 16a that is fitted into the outer tube 15a such that its end is in contact with the outer ring 12a, and a cleat engagement mechanism 17a fixed to the outer tube 15a. The outer tube 15a and the inner tube 16a are concentrically arranged around the outside of the pedal spindle 3a. The base end of the inner tube 16a projects out from the outer tube 15a on the crank 2 side at the same diameter as the outer tube 15a.

Outer tube 15a is provided on both sides (top and bottom) with an engagement fixing surface 18a that serves to fix the cleat engagement mechanism 17a. The cleat engagement mechanism 17a engages the pedal 1 with the cleat 22 attached to the sole of a bicycle shoe 21. The cleat engagement mechanism 17a has a front cleat engagement member 30a that engages the front of the cleat 22, and a rear cleat engagement member 31 that engages the rear of the cleat. The front cleat engagement member 30a is symmetrical on the left and right. Cleat engagement member 3a has a fixed member 32a that is fixed to the engagement fixing surface 18a and a cleat clamping member 33a that curves out in a U shape above the front of the fixed member 32a. A rotation stopper 34a that extends rearward is formed at the rear of the fixed member 32a, and a pair of cleat supports 35a and 36a extend to the right and left in the center of the fixed member 32a with a space between them in the forward and backward direction. In the fixed member 32a, a movement restricting stopper 37a that restricts the forward movement of the cleat is formed such that it curves upward between the cleat clamping member 33a and the cleat support 35a.

Figure 7:
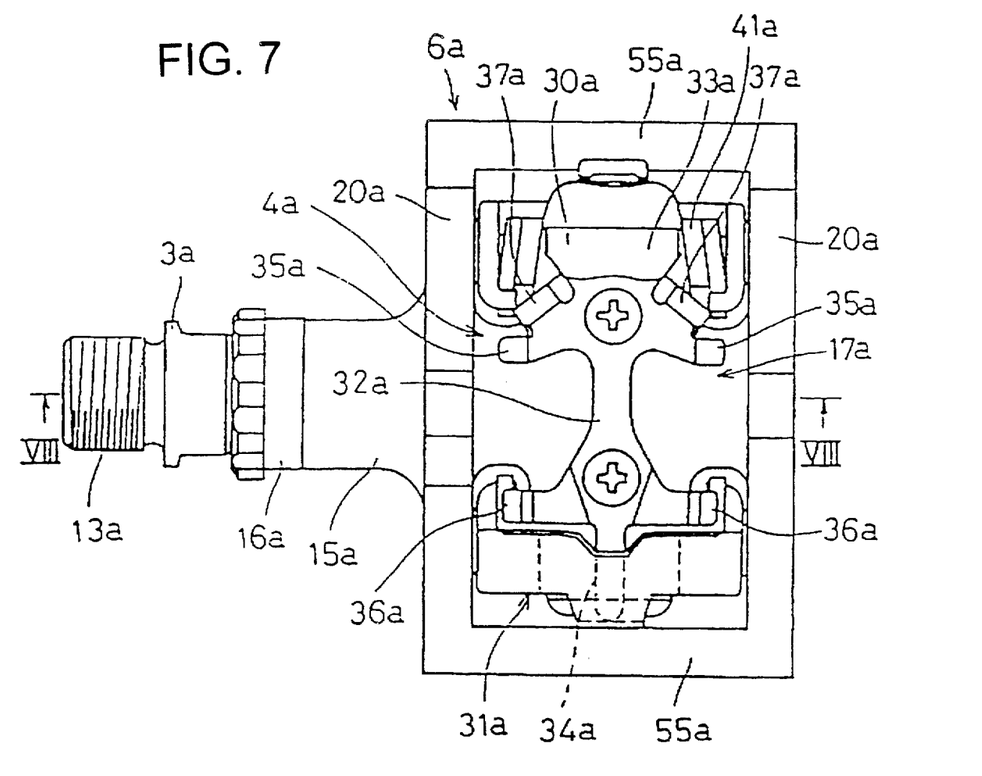
FIG. 7 is a plan view of the bicycle pedal shown in FIG. 6.

The rear cleat engagement member 31a is curved in a rough inverted U shape, and the two ends thereof are swingably supported by a fixed shaft 40a (see FIG. 6) that passes between the brace arms 20a, which are discussed below. A canceling spring 41a (the one shown in FIG. 7 is used for the rear cleat engagement member 31a on the back side) is wound around the outside of this fixed shaft 40a, and this spring 41a energizes the rear cleat engagement member 31a such that it always rotates forward (the direction of the arrow C in FIG. 9). In order to restrict this forward rotation, a tongue 42a that is in contact with the rotation stopper 34a extends downward in the center at the rear of the rear cleat engagement member 31a.

Figure 9:
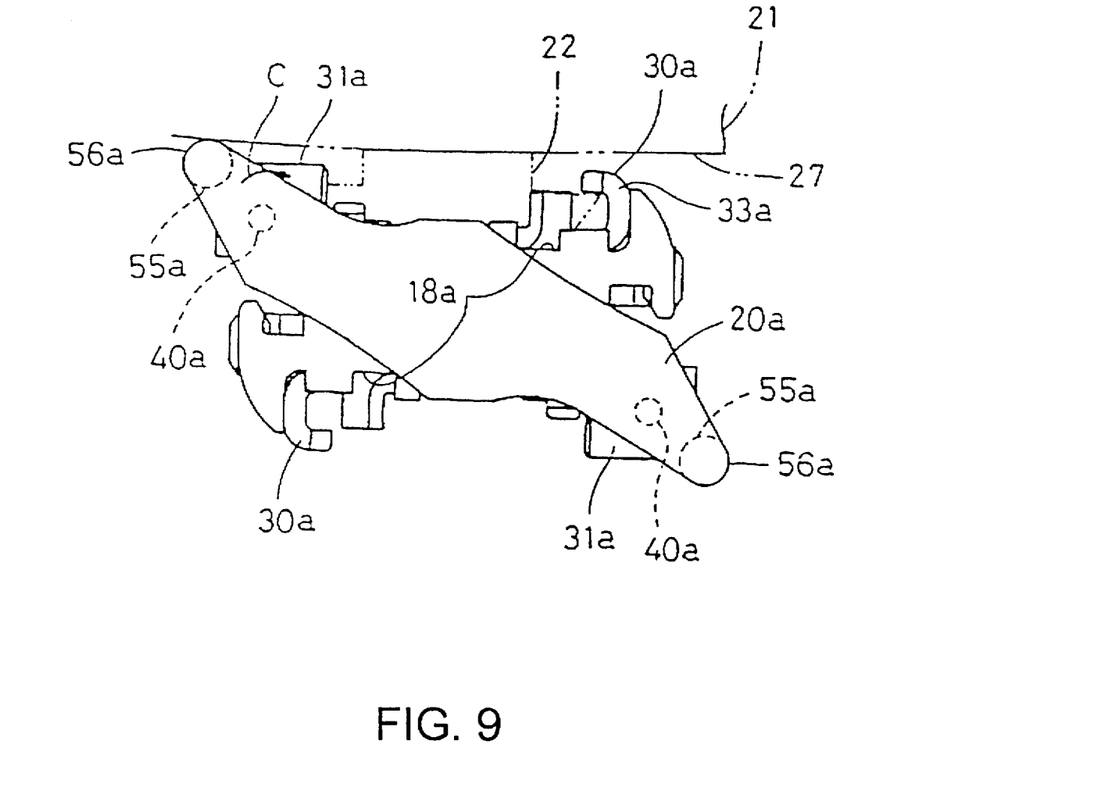
FIG. 9 is a side view of the bicycle pedal shown in FIG. 6.

The brace frame 6 comprises a pair of brace arms 20a and a brace member 55a that links the two ends of the brace arms 20a behind the rear cleat engagement member 31a. The brace arms 20a are provided as a left and right pair that extend in the shape of a compressed S (in plan view) forward and backward and are spaced apart in the pedal axial direction. As shown in FIG. 9, the brace arms 20a are in the shape of a compressed S that curves upward and downward so that the front cleat engagement member 30a projects out above the brace arms 20a. The brace member 55a is a dowel-shaped member that links the two opposing ends of the pair of brace arms 20a, and the rear portion serves as a guide member 56a that is used to guide the cleat 22 smoothly. The height of the brace member 55a should be essentially equal to or greater than that of the rear cleat engagement member 31a. Further, the length of the brace member 55a should be equal to or greater than the length of the rear cleat engagement member 31a in the pedal axial direction.

If a brace member 55a with a structure such as this is provided, the portion of the shoe sole behind the cleat 22 that corresponds to the arch of the foot and does not come into contact with the ground will be supported in contact with the brace member 55a, so the shoe 21 will not be as loose to the right and left with respect to the pedal. Also, the guide member 56a of the brace member 55a serves as a guide for the cleat 22 during the attachment of the shoe 21, which allows the shoe 21 to be engaged with the cleat engagement mechanism 17a more smoothly.

Operation of the pedal shown in FIG. 6 will now be described. In the attachment of the shoe to the pedal 1a, the tip of the shoe sole 27 is moved forward toward the front cleat engagement member 30a while in contact with the brace member 55a, and the tip of cleat 22 is inserted into the cleat clamping member 33a. In this state, since the front cleat engagement member 30a is positioned above the brace arms 20a and the brace member 55a, these components do not get in the way, and the tip of the cleat 22 can be easily inserted into the front cleat engagement member 30a. Once the tip of the cleat 22 has been inserted into the cleat clamping member 33a of the front cleat engagement member 30a, force is applied to the heel side of the shoe 21 and the shoe 21 is pushed down toward the pedal 1. As a result, the rear end of the cleat 22 rotates the rear cleat engagement member 31a backward, and the cleat 22 slides between the two cleat engagement members 30a and 31a. Once the cleat 22 has slid between the two cleat engagement members 30a and 31a, the rear cleat engagement member 31 a is biased by the spring 41 a to its original position. As a result, the cleat 22 is engaged between the two cleat engagement members 30a and 31a. At this point, since the shoe sole 27 is in contact with the brace member 55a at the portion behind the cleat 22, where the sole does not touch the ground, it is not affected by wear and the like, so the looseness to the right and left of the shoe 21 can be prevented. Because of this, the pedaling force is transmitted efficiently to the pedal 1a. When the shoe is to be removed from the pedal 1a, if the heel portion of the shoe 21 is lightly twisted to the outside, the rear cleat engagement member 31 a will swing to the rear against the energizing force of the spring 41a, and the engagement of the rear end of the cleat 22 will be released instantly.

While the above is a description of various embodiments of the present invention, further modifications may be employed without departing from the spirit and scope of the present invention. For example, the shape of the cleat engagement members is not limited to that in the above embodiments, and the present invention can also be applied to cleats of other configurations. The structure and position of the brace member are not limited to those in the above embodiment, as long as the height of the brace member is substantially the same as or greater than that of the rear cleat engagement member. The present invention can also be applied to a shoe in which the cleat projects out from the shoe sole, as in the case of a road-racing shoe. Since the sole of a shoe such as this is usually made from a relatively hard synthetic resin, the effect of the present invention at preventing looseness will be even better compared to a mountain bike shoe. In the embodiment shown in FIG. 6, the brace frame 6 may be rotatably supported by the linking member 4, and the brace frame 6 may be biased by a spring so that the height of the brace member 55a will be substantially the same as or greater than that of the rear cleat engagement member 31a. Also, a lever member may be positioned at both ends of the brace member 55a, and the lever member swingably supported by the brace frame 6.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle pedal comprising:

a pedal spindle (3);

a support (15) mounted to the pedal spindle (3), wherein the support (15) rotates around the pedal spindle (3);

front and rear cleat engaging members (30,31) rotatably mounted to the pedal spindle (3), wherein at least one of the front and rear cleat engaging members (30,31) is coupled to the support (15) so that the at least one of the front and rear cleat engaging members (30,31) pivots relative to the support (15) and rotates around the pedal spindle (3); and a brace member (55) rotatably mounted to the pedal spindle (3) and positioned behind the rear cleat engaging member (31), wherein the brace member (55) has a height that is greater than or equal to a height of the rear cleat engaging member (31), and wherein the brace member (55) rotates relative to the support (15).

2. The pedal according to claim 1 wherein the brace member (55) includes a guide surface (56).

3. The pedal according to claim 1 wherein a length of the brace member (55) in an axial pedal direction is greater than or equal to a length of the rear cleat engaging member (31) in the axial pedal direction.

4. The pedal according to claim 1 further comprising a stopper member (20) fixed relative to at least one of the front and rear cleat engaging members (30,31), the stopper member (20) extending in a longitudinal direction.

5. The pedal according to claim 4 wherein the stopper member (20) is aligned below the front cleat engaging member (30) when viewed in the axial pedal direction.

6. The pedal according to claim 4 further comprising a tread cage (5) coupled to the pedal for rotation relative to the front and rear cleat engaging members (30,31), and wherein the brace member (55) is disposed on the tread cage (5).

7. The pedal according to claim 6 wherein the tread cage (5) substantially surrounds the front and rear cleat engaging members (30,31) and the stopper member (20).

8. The pedal according to claim 7 wherein the brace member (55) bridges a rear portion of the tread cage (5) and is fixed thereto, and wherein the stopper member (20) extends to the rear portion of the tread cage (5) for contacting the brace member (55) and limiting rotation of the stopper member (20) relative to the tread cage (5).

9. The pedal according to claim 8 further comprising a spring (26) disposed between the tread cage (5) and the stopper member (20) for biasing the rear cleat engaging member (31) downward relative to the brace member (55).

10. The pedal according to claim 1 further comprising first and second stopper members (20 disposed on opposite sides of the front and rear cleat engaging members (30,31) in an axial pedal direction and fixed relative to at least one of the front and rear cleat engaging members (30,31), the first and second stopper members (20) extending in a longitudinal direction perpendicular to the axial pedal direction.

11. The pedal according to claim 10 wherein the first and second stopper members (20) are aligned below the front cleat engaging member (30) when viewed in the axial pedal direction and are aligned with each other when viewed in the axial pedal direction.

12. The pedal according to claim 10 further comprising a tread cage (5) coupled to the pedal for rotation relative to the front and rear cleat engaging members (30,31), and wherein the brace member (55) is disposed on the tread cage (5).

13. The pedal according to claim 12 wherein the tread cage (5) substantially surrounds the front and rear cleat engaging members (30,31) and the first and second stopper members (20).

14. A bicycle pedal for attachment to a cleat (22) fixed to a bicycle shoe (21), the pedal comprising:

front and rear cleat engaging members (30,31) coupled to the pedal for engaging corresponding front and rear portions of the cleat (22);

a brace member (55) positioned behind the rear cleat engaging member (31), the brace member (55) having a height that is greater than or equal to a height of the rear cleat engaging member (31);

first and second stopper members (20) disposed on opposite sides of the front and rear cleat engaging members (30,31) in an axial pedal direction and fixed relative to the front and rear cleat engaging members (30,31) the first and second stopper members (20) extending in a longitudinal direction perpendicular to the axial pedal direction, a tread cage (5) coupled to the pedal for rotation relative to at least one of the front or rear cleat engaging members (30,31), and wherein the brace member (55) is disposed on the tread cage (5), wherein the tread cage (5) substantially surrounds the front and rear cleat engaging members (30,31) and the first and second stopper members (20); and wherein the brace member (55) bridges a rear portion of the tread cage (5) and is fixed thereto, wherein an abutment (49) is spaced apart from the brace member (55) and defines an opening between the abutment (49) and the brace member (55), and wherein the first and second stopper members (20) extend into the opening for alternately contacting the abutment (49) and the brace member (55) for limiting rotation of the first and second stopper members (20) relative to the tread cage (5).

15. The pedal according to claim 14 further comprising a spring (26) disposed between the tread cage (5) and the first and second stopper members (20) for biasing the rear cleat engaging member (31) downward relative to the brace member (55).

* * * * *